Patented Jan. 1, 1929.

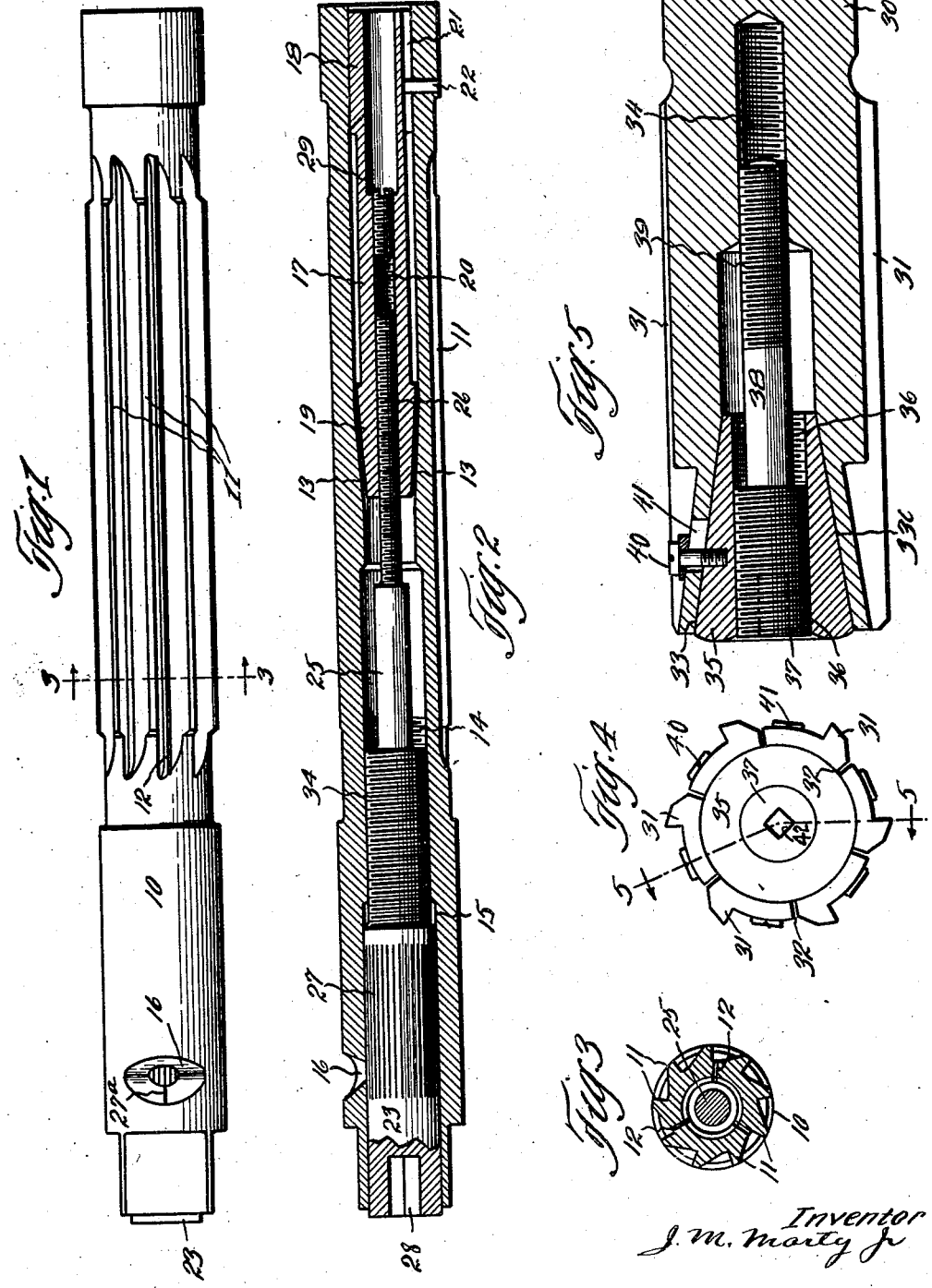
Jan. 1, 1929.    J. M. MARTY, JR    1,697,509
EXPANSIBLE REAMER
Filed Feb. 20, 1924

1,697,509

UNITED STATES PATENT OFFICE.

JOHN M. MARTY, JR., OF CLEVELAND, OHIO.

EXPANSIBLE REAMER.

Application filed February 20, 1924. Serial No. 694,087.

This invention relates generally to metal cutting tools and more particularly to expanding or adjustable reamers.

Tools of this kind are usually formed with a central longitudinal bore and are longitudinally slotted. The expansion is accomplished by the movement of a wedge or expander, and this wedge or expander is usually moved by means of a single screw or thread and while a fairly gradual expansion can be had there are certain instances where an exceedingly minute expansion or adjustment is desired and which cannot be readily accomplished through the medium of a single screw and thread.

The object of my invention, therefore, is to overcome these various difficulties, that is to say, to provide an expansible tool in which the expansion can be exceedingly fine and gradual, one in which the amount of expansion can be accurately determined, and one which can be locked after such expansion and remain so until released.

With these various objects in view, the invention consists primarily in providing a differential screw for effecting the exceedingly fine and gradual movement of the expander, and the invention also consists in providing the expanding means with graduations which are visible from the exterior of the tool, and the invention also includes means for effectively locking the expander against movement.

The invention consists also in certain details of construction hereinafter fully described and set forth in the appended claims.

In the drawings forming a part of this specification, Fig. 1 is a side view of an expanding reamer constructed in accordance with and embodying my invention; Fig. 2 is a sectional view of the same partly in elevation; Fig. 3 is a transverse sectional view on the line 3—3 of Fig. 1; Fig. 4 is an end view of a modified form of tool; and Fig. 5 is a longitudinal sectional view on the line 5—5 of Fig. 4.

In carrying out my invention I employ a reamer body 10 formed with the usual cutting surfaces 11 and longitudinal slots are formed in the body in order to permit the radial expansion of the tool. The body is bored longitudinally from end to end and the interior of the bore is formed with the inclined or tapering surfaces 13 and the bore is also internally threaded as shown at 14. Adjacent to the threaded portion 14 the bore is made smooth and somewhat larger as indicated at 15. An opening 16 is produced in the body in line with the portion 15, this opening being counterbored upon the exterior as most clearly shown in Figs. 1 and 2.

An expander member 17 is inserted in the bore from the opposite end, the outer end 18 of said expander fitting snugly within the bore as shown while its inner end is made tapering or wedge shape as shown at 19, this tapering or conical end 19 being adapted to contact with the tapering or inclined surfaces 13 for the purpose of expanding the tool. The expander 17 is internally threaded as shown at 20.

A longitudinal groove 21 is produced in the cylindrical end 18 of the expander and a key pin 22 passing through the body into the longitudinal slot 21 holds the expander against rotation but permits the same to move longitudinally in or out as desired.

The expander is actuated by a member fitted into the opposite end of the bore, said member comprising the smooth portion 23 which fits into the portion 15 of the bore and is externally threaded as shown at 34 for engagement with the internal screw threads 14 of the bore, reduced at 25 and provided with a threaded end 26 which screws into the threaded portion 20 of the expanding wedge or cone 19. The threads 34 and 14 are of different pitch from the threads 26 and 20 so that a differential movement is obtained between the actuator and the expander.

In practice I prefer to cut the threads 34 and 14 upon the 27 pitch while the threads 26 and 20 are cut upon the 24 pitch. This ratio will give an exceedingly fine adjustment effecting an exceedingly fine and gradual expansion of the reamer which is necessary in certain classes of work.

The cylindrical portion 23 has graduations 27 arranged thereon and extending entirely around the same, these graduations being visible through the opening 16 and a gage mark 27ª is placed upon the counterbore of the opening 16 and with which the graduations can be caused to register, and by moving the actuator to either direction the amount of movement can be gaged.

A socket recess 28 is provided in the end of the actuator for the insertion of a suitable tool for turning the same. A screw plug 29 is screwed into the end of the expander and is adapted to be brought into locked engagement with the end of the differential screw for preventing further movement and it is obvious that when this locking screw is brought into operation, the adjusting mechanism of the tool is securely locked and consequently the tool can be removed from the machine, laid aside and replaced without danger of the adjustment being disturbed in the meantime.

In the construction shown in Figs. 1 and 2, the expansion is intermediate the ends of the reamer. In the construction shown in Figs. 4 and 5, the expansion takes place at the end of the reamer.

In this form of device 30 indicates the body of the tool having the cutting surfaces 31. Longitudinal slots 32 extend to the end of the tool. A central longitudinal bore is provided and the outer end of this bore is tapered as shown at 33. The extreme inner end of the bore is internally threaded as shown at 34. A tapering or conical expander 35 is inserted in the tapering bore 33, this tapering expander being internally threaded as shown at 36 in which fits the screw 37, this screw having an inwardly extending portion 38 externally threaded as shown at 39 for engagement with the threaded portion 34 of the bore while the threaded portion 37 and the screw engages the threads 36 of the expander 35, and it will be noted that the threads 37 and 36 are of different pitch from the threads 39 and 34, the threads 37 being cut upon the 27 pitch while the threads 39 are cut upon the 24 pitch, as previously described, so that a differential movement between the screw and expander can be had.

Locking screws 40 pass through longitudinal slots 41 cut in the body of the tool, these pins holding the expander against rotation and also by turning the same down, securely lock the parts against further movement.

It will thus be seen that I provide an exceedingly simple and efficient expanding reamer capable of very fine adjustment due to the ratio of the threads of the differential screw, and it will also be noted that the adjustable parts can be securely locked against movement in either direction when desired.

In the construction shown in Figs. 4 and 5, graduations can be made upon the end of the screw and the expanding member in order to gage the amount of movement of said screw. A socket 42 will be provided in the end of the actuator for the reception of the proper operating tool.

Having thus described my invention what I claim is:

1. In a tool of the kind described, the combination with a body longitudinally bored and slotted and having exterior cutting surfaces, said bore having a threaded portion and a tapering portion spaced from the threaded portion, of an expanding member externally tapered and internally threaded, and keyed to prevent rotation while moving longitudinally, and an actuator arranged in said body and having a threaded portion engaging the threaded portion of the body and another threaded portion engaging the internal threads of the expander, the threads of the actuator being of the same character but of different pitch, said expander by its movement engaging the tapered and slotted portion of the body and expanding the cutting surfaces.

2. In a tool of the kind described, the combination with a body longitudinally bored and slotted and having exterior cutting surfaces, said bore having a threaded portion and a tapering portion spaced from the threaded portion, of an expanding member externally tapered and internally threaded, and keyed to prevent rotation while moving longitudinally, and an actuator arranged in said body and having a threaded portion engaging the threaded portion of the body and another threaded portion engaging the internal threads of the expander, the threads being of the same character but of different pitch, and means arranged within the expander for limiting the movement of the actuator and holding said expander and actuator against movement.

In testimony whereof, I hereunto affix my signature.

JOHN M. MARTY, Jr.